Aug. 19, 1969     K. VÖHRINGER     3,461,909
VALVE ARRANGEMENT
Filed Sept. 21, 1967
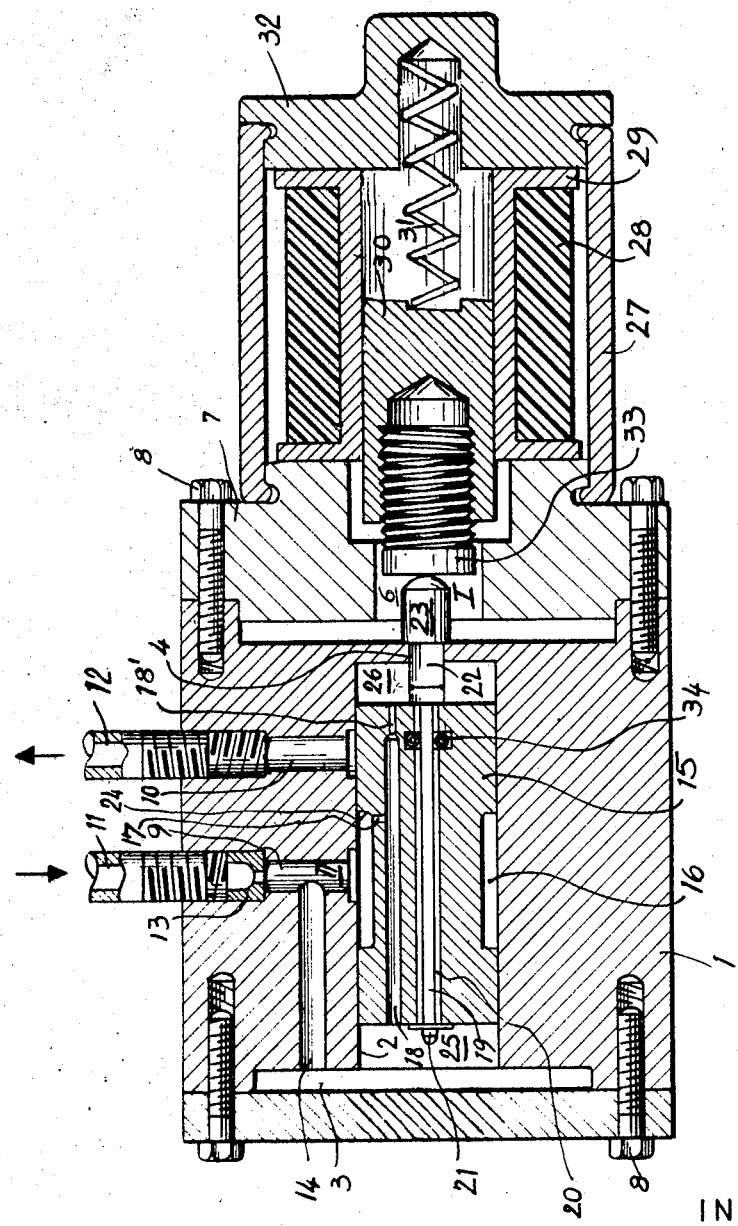
INVENTOR:
KARL VÖHRINGER
By    *Kurt Kelman*
AGENT

United States Patent Office 3,461,909
Patented Aug. 19, 1969

3,461,909
VALVE ARRANGEMENT
Karl Vöhringer, Konigsbergerstrasse 15,
Malsch, near Mannheim, Germany
Filed Sept. 21, 1967, Ser. No. 669,419
Int. Cl. F16k *31/14*
U.S. Cl. 137—495                                    6 Claims

ABSTRACT OF THE DISCLOSURE

A pressure control valve having a plunger. A recess thereof may connect orifices of a pressure conduit and a return conduit in the enclosing cylinder. One of two cylinder chambers separated by the plunger communicates with the pressure conduit near the orifice and downstream from a throttling nozzle. A cylinder rod passes through the other chamber and is urged inward of the cylinder by a control solenoid. A duct connects the chambers, and a passage extends from the duct to the portion of the recess nearest the return orifice in the valve-opening plunger position.

BACKGROUND OF THE INVENTION

This invention relates to pressure control valves, and particularly to valves suitable for automatically controlling the pressure prevailing in a hydraulic circuit by draining fluid from the circuit when the pressure exceeds a desired value.

In its more specific aspects, this invention is concerned with pressure control valves for application in circuits of extremely high pressure, and capable of being set for a desired pressure by a minimal control force.

Known valves of the type described are hydraulically operated by pilot valves requiring a separate low pressure circuit for their operation, and a pump or the like to supply operating fluid at the lower pressure.

An important object of this invention is the provision of a pressure control valve suitable for use in extreme-pressure circuits, capable of being controlled by very weak signals, yet simple in its construction and not requiring a separate hydraulic pilot circuit with a separate source of pressure fluid.

SUMMARY OF THE INVENTION

The valve of the invention is a slide valve in which axially offset pressure and return orifices in a valve casing or cylinder may be connected or disconnected by a recess in a plunger axially slidable in the cylinder. Pressure fluid is supplied from the controlled circuit to the pressure orifice and to one of the two chambers at the axial ends of the cylinder through a pressure reducing throttling nozzle. A piston rod extends from the plunger through one of the chambers and outward of the cylinder where it is engaged by a pressure device tending to move the rod inward of the cylinder.

The plunger axially divides the cylinder space into two chambers and has a smaller effective piston face in one chamber than in the other, the chambers being connected by a duct which preferably extends axially through the plunger and is provided with a throttle impeding flow between the chambers and thereby damping oscillation of the plunger. A passage connects the duct with a portion of the afore-mentioned recess which is near the return orifice in the valve-opening position of the plunger to reduce the pressure differential in the recess between the two orifices and the resulting axial forces exerted on the plunger which would interfere with precise and rapid response of the plunger to changes in the control pressure applied to the piston rod. Means are preferably provided for varying this pressure.

Other features, additional objects, and many of the attendant advantages of this invention will readily be understood from the following detailed description of a preferred embodiment when considered in connection with the attached drawing.

BRIEF DESCRIPTION OF THE DRAWING

The sole figure of the drawing shows a solenoid controlled slide valve of the invention in plan section.

DESCRIPTION OF THE PREFERRED EMBODIMENT

The valve has a heavy-walled cylinder 1 provided with an axial bore, the main portion 2 of which is cylindrical. One end portion 3 of the bore is enlarged, and the other end portion 4 is narrow. The wide end 3 of the bore is closed by a flat cylindrical cover 5, and the narrow end 4 is aligned with a central bore 6 in a head 7, the cover 5 and head 7 being attached to the cylinder 1 by screws 8.

Axially offset radial bores 9, 10 connect the main portion 2 of the cylinder bore with a pressure conduit 11 and a return conduit 12. A throttling nozzle 13 is mounted in the bore 9 which communicates with the wide end 3 of the axial cylinder bore through an axial channel 14 in the cylinder wall.

The main bore portion 3 slidably accommodates a plunger 15 of generally cylindrical shape. A shallow annular groove 16 in the curved outer wall of the plunger 15 is of sufficient axial length to connect the orifices of the bores 9, 10 when the plunger moves toward the right from the illustrated position. A narrow, radial throttling passage 17 connects the groove 16 with an eccentric axial duct 18 in the plunger 15. The duct has a reduced portion 18′ between the passage 17 and the end of the bore near the head 7.

A rod 19 is axially secured in an oversized, central, axial bore 20 of the plunger 15 by a capnut 21 near the cover 5 and an enlarged shoulder portion 22 of the rod 19 which is slidably received in sealing engagement in the narrow end portion 4 of the axial cylinder bore. The rod 19 carries an abutment 23 which projects from the shoulder portion 22 into the central bore 6 in the head 7 and abuts against a radial face of the cylinder 1 in the illustrated position in which the plunger 15 axially separates two chambers 25, 26 in the main portion 2 of the cylinder 1.

The head 7 serves as a base for the casing 27 of a solenoid having a winding 28 mounted on a form 29 in which a core 30 is slidably received in axial alignment with the cylinder 1. A spring 31 interposed between the core 30 and the cover 32 of the solenoid casing normally urges an abutment pin 33 on the core against the abutment head 23 on the rod 19. To avoid the transmission of transverse stresses to the rod 19 which could affect the tightness of the seal in the narrow bore portion 4, a spherically curved face of the abutment head 23 engages a flat face on the pin 33, and the rod 19 is permitted limited tilting movement in the bore 20 by a resilient gasket ring 34.

The afore-described apparatus operates as follows:

Hydraulic fluid is admitted to the valve through the conduit 11 from a circuit which is controlled by the valve, but not shown in the drawing. The liquid fills the bore 9, the groove 16, the channel 14, the chambers 25, 26, the passage 17, and the duct 18. The force exerted by the liquid on the piston face of the plunger 15 in the chamber 25 is not balanced by the force exerted on the smaller annular piston face in the chamber 26, and the force differential is overcome by the spring 31 which urges the core 30 and its pin 33 against the head 23.

When the solenoid winding 27 is energized in a conventional manner, not illustrated, by an adequate control current, the resulting electromagnetic force in cooperation with the liquid pressure in the cylinder 1 causes the plunger 15 to move toward the right until the groove 16 connects the orifices of the bores 9, 10, and fluid is permitted to escape through the return conduit 12 to the sump (not shown) of the hydraulic circuit. Because of the throttling nozzle 13 in the bore 9, the pressure within the valve cylinder 1 drops below the full line pressure in the conduit 11 as soon as liquid flows through the nozzle, and the pressure of the spring may be sufficient to move the plunger 15 back toward the left, as viewed in the drawing until the available orifice of the conduit 10 passes just enough liquid that the combined forces of the liquid in the cylinder 1 and of the current in the solenoid winding 28 balance the spring 31.

When the plunger 15 moves in the main bore portion 3, liquid flows through the duct 18 between the chambers 25, 26, and the reduced portion 18' of the duct 18 damps the plunger movement, thereby preventing axial oscillation of the plunger whenever the intensity of the current in the winding 27 is changed.

The rate of liquid flow from the pressure conduit 11 through the groove 16 to the return conduit 12 is much higher when the valve is open than the flow rate from the conduit 11 through the channel 14 to the chamber 25 and from there through the duct 18 to the chamber 26. The pressure in the duct 18 is thus higher whenever the valve is open than the pressure in the groove 16, and a small amount of liquid flows from the axial duct 18 through the passage 17 into the portion of the groove 16 remote from the bore 9. This added liquid offsets to some extent the dynamic pressure differential between the two axial ends of the groove. The pressure acting on the two annular radial walls 24 of the groove is thus closely balanced in all operating positions of the plunger 15 and cannot materially affect the response of the valve to changes in solenoid current.

The drain of liquid from the pressure conduit 11 to the return conduit 12 affects the pressure in the hydraulic system of which the conduit 11 is a part, and which is not otherwise shown in the drawing. The system pressure is precisely controlled in response to the force exerted by the solenoid on the abutment head 23 of the rod 19. This force may be extremely small for controlling very high pressures. Still, the valve, in effect, has only one moving part, and is operated directly by line pressure because of the provision of the nozzle 13 which is interposed between the pressure conduit 11 and the chamber 25, and the connecting duct 18 whose reduced portion 18' performs an additional damping function, as described above.

The ability of the valve to handle liquid at very high pressure is substantially enhanced by the tiltable mounting of the rod 19 in the plunger 15 which minimizes the deleterious defects of even minor misalignments in a high-pressure device of the type described.

The passage 17 contributes significantly to the precision with which the valve responds to electrical signals fed to the solenoid winding 27, thereby permitting remotely installed current controls for the solenoid to be calibrated directly in units of pressure in the conduit 11 if the characteristics of the hydraulic circuit are known, as is normal.

The stroke of the plunger 15 during normal operation is very small. A very small solenoid may therefore be employed in the valve of the invention to bring about relatively great pressure changes in a high pressure system promptly after an electrical signal, such as a change in control current in the winding 28 is received. When the winding is not supplied with current, the valve acts as a pressure limiting device, the maximum pressure being determined by the spring 31. If the valve is employed to maintain a constant pressure, a suitably selected spring 31 may be employed as the sole source of control pressure on the abutment head 23.

What is claimed is:
1. In a valve arrangement, in combination:
 (a) a cylinder member having an axis and formed with an axial bore and two radial bores having respective axially offset orifices in said axial bore;
 (b) a plunger member axially slidable in said bore between a valve opening and a valve closing position and defining first and second axially spaced chambers in said axial bore, said plunger member being formed with a recess connecting said orifices in the valve opening position of the plunger member only;
 (c) rod means fastened to said plunger member and extending therefrom through said first chamber and outward of said axial bore;
 (d) pressure means engaging said rod means and urging the same to move inward of said axial bore;
 (e) a source of fluid;
 (f) a conduit connecting one of said chambers and one of said radial bores to said source;
 (g) a nozzle arranged in said conduit for throttling flow of said fluid from said source to said one chamber and to said one bore; and
 (h) a duct connecting said chambers, the effective piston face of said plunger member in said first chamber being smaller than in said second chamber.

2. In an arrangement as set forth in claim 1, said duct extending axially in said plunger member between said chambers.

3. In an arrangement as set forth in claim 2, throttle means in said duct for impeding fluid flow between said chambers.

4. In an arrangement as set forth in claim 2, a passage in said plunger member connecting said duct to a portion of said recess nearer the other one of said orifice when said plunger member is in the valve opening position thereof.

5. In an arrangement as set forth in claim 1, said one chamber being said second chamber.

6. In an arrangement as set forth in claim 1, control means for varying the pressure of said pressure means.

References Cited

UNITED STATES PATENTS

| | | | |
|---|---|---|---|
| 2,722,234 | 11/1955 | Macgeorge et al. | 137—620 |
| 2,731,034 | 1/1956 | Dinkelkamp | 137—495 |
| 2,896,588 | 7/1959 | Hayner et al. | 137—625.64 XR |
| 2,949,131 | 8/1960 | Collins | 137—625.64 |
| 3,105,515 | 10/1963 | Webb | 137—495 |
| 3,349,800 | 10/1967 | Herion et al. | 137—625.66 |

HENRY T. KLINKSIEK, Primary Examiner

ROBERT J. MILLER, Assistant Examiner

U.S. Cl. X.R.

137—625.64; 251—129